United States Patent [19]
Someda

[11] Patent Number: 4,758,066
[45] Date of Patent: Jul. 19, 1988

[54] ROUND BIREFRACTION DIELECTRIC WAVE-GUIDE

[75] Inventor: Carlo G. Someda, Padua, Italy

[73] Assignee: Pirelli General plc, London, England

[21] Appl. No.: 888,923

[22] Filed: Jul. 22, 1986

[30] Foreign Application Priority Data

Jul. 26, 1985 [IT] Italy .................... 41584 A/85

[51] Int. Cl.⁴ ................ G02B 6/00; G02B 6/10
[52] U.S. Cl. ................ 350/96.30; 350/96.10; 350/96.29
[58] Field of Search ........... 350/96.23, 96.29, 96.30, 350/96.31, 96.33

[56] References Cited

U.S. PATENT DOCUMENTS 4,415,230  11/1983  Keck .................... 350/96.30 X
4,478,489  10/1984  Blankenship et al. ........ 350/96.30
4,681,399  7/1987   Hicks, Jr. ............... 350/96.29 X Primary Examiner—William L. Sikes
Assistant Examiner—Akm E. Ullah
Attorney, Agent, or Firm—Brooks Haidt Haffner & Delahunty

[57] ABSTRACT

A round birefraction dielectric wave-guide has in section a central round zone with a constant, or substantially constant, refractive index n1, an outer zone preferably with a constant refractive index n2 and an intermediate zone divided into 8 (or multiples of 8) angular sectors. Respective alternate sectors have refractive indices n3 and n4. Refractive index n3 may be constant but index n4 varies in inverse proportion to the square of the distance from the axis of the waveguide. N1 is greater than n2, n1 is greater tha n3 and n4 lies between n1 and n2. The wave-guide is subjected to torsion around the longitudinal axis of symmetry thereof and-/or is spirally wound around a cylinder.

10 Claims, 1 Drawing Sheet

ROUND BIREFRACTION DIELECTRIC WAVE-GUIDE

For some years there has been increasing technical interest in wave-guides (or optical fibers, if the term is preferred) made of glass silica with very low attenuation, characterised by marked and deliberately anisotropic behaviour.

For reasons connected with the principal uses of such means of transmission, this interest has been concentrated on the said guides (with a slight inaccuracy now generally accepted in current use) having a single mode of transmission (also termed monomodal or unimodal guides), characterised in reality by the fact that they can guide rays in two different states of polarization which, in general and strictly, are elliptical only. Nearly all present or foreseeable applications are concentrated on two extreme cases: one in which such polarization ellipses are equivalent to two orthogonal lines, and one in which they are equivalent to two circumferences, travelled in opposite directions. They are then referred to as straight birefraction, or linear birefringent, guides and round birefraction, or circular birefrigerent, guides respectively. There have been more experiments and there is greater present knowledge on the former than the latter, but more recently the latter have also been the subject of numerous studies.

Present technical applications of round birefraction optic guides mainly concern sensors and transducers of physical magnitudes; in particular, they are useful in the construction of measuring instruments for static or slowly variable magnetic fields. But it is not difficult to foresee their use also in the manufacture of components for application at the ends, or in particular sections, of telecommunication systems that employ isotropic or straight birefraction optical fibers as means of transmission. Both in this case, and in the field of sensors and transducers, it is very important to give consideration to the problem of connectability between isotropic guides and round birefraction guides.

To obtain a round birefraction guide in a simple way, it is necessary to have a material characterised by a dielectric permittivity diad (or tensor, if the term is preferred) which, in a Cartesian orthogonal scheme, has two out-of-diagonal elements different from zero (in particular, imaginary and of opposite signs), and the elements of the main diagonal equal to each other.

With glass silica these conditions cannot be obtained on a microscopic scale, i.e. by acting on the local chemical or physical properties of the material.

The technique through which round birefraction guides can be obtained involve mechanical operations which ensure that, on a macroscopic scale (i.e. on distances appreciably greater than the wavelength of the guided rays), the average properties of the guide are equivalent to those of a means having the above-stated characteristics.

The mechanical operations can be reduced in substance to the following two steps:

a structure is obtained which, unlike an isotropic optic guide, is not of a symmetrical nature revolving round the longitudinal axis or direction of propagation, which axis will hereinafter be termed axis z;

the said structure is subjected to torsion round axis z and/or spirally wound on a cylinder whose generatrices are parallel to axis z.

For a better understanding of the drawbacks of the round birefraction optical guides hitherto produced—drawbacks that this invention intends to overcome—a fuller description of the guides in question is required. They can be grouped into two classes:

(a) guides in which the section (of the central core, or the entire guide) is divided into m angular sectors (normally m=8 or a multiple of 8, in order to avoid straight birefraction superimposed on circular) having alternate refraction indices n1 and n2, with n1>n2.

In this type of guide neither n1 nor n2 is intentionally the function of a point.

Figure 1A:
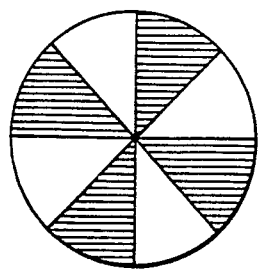
FIGS. 1a and 1b are diagrammatic end views of prior art optical guides.
Figure 1B:
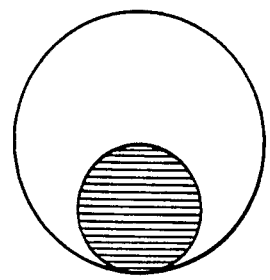

Torsion takes place around the axis on which the sectors in question converge (see FIG. 1a);

(b) guides in which the core section is electrically homogeneous, but in which the said core is then spirally wound around an axis other than that of symmetry of the core itself (see FIG. 1b).

In type "a" guides, the guided electromagnetic energy is distributed over the section in a highly different way from that found in an isotropic monomodal optic fiber.

The light inlet and outlet operations at the two ends of a length of type "a" guide are therefore accompanied by large losses; in theory these can be reduced in part, but at the price of interposing guide lengths with slowly varying characteristics, i.e. a technologically very high and hitherto practically never obtained price.

This drawback does not arise in type "b" guides, but this occurs at the cost of an appreciable reduction in maximum round birefraction compatible with maximum torsion through which a fibre is still capable of guiding light. If, in fact, there is a drop below a certain minimum pitch in the winding, an optic fibre radiates the light instead of guiding it.

Therefore, given parity of external overall performances, a device made with a type "b" guide requires a much greater guide length than in the case of type "a", with consequent increase in losses linked to length of the radiation course.

The two drawbacks just described are mutually exclusive of each other, but the present state of technology compels selection of one or the other of them, without possibility of compromise.

The invention, on the other hand, allows the two drawbacks to "offset" each other, in controllable quantity, so as to allow the optimisation of the performances of each device of given nominal characteristics.

The present invention provides a round birefraction dielectric waveguide characterisd by the fact that its section has a central round zone with constant, or substantially constant, refractive index n1, an outer zone with refractive index n2, an intermediate region divided into 8, or multiples of 8, anglar sectors, respective alternate sectors having refractive indices n3 and n4, n3 being constant or varying in inverse proportion to the square of the distance from the axis of the wave-guide and n4 varying in inverse proportion to the square of the distance from the axis of the waveguide, n1 being greater than n2, n1 greater than n3, and n4 lying between n1 and n2, the said guide twisted with respect to its longitudinal axis of symmetry, such as by being subjected to torsion around a longitudinal axis of symmetry and/or by being spirally wound around a cylinder.

The central round zone may have its radius as small as desired.

In the intermediate region two adjacent sectors may have angular widths whose sum is equal to $4\pi$ divided by the total number of sectors.

The refractive index n2 of the outer zone may be constant, alternatively it may vary in the radial direction.

In the intermediate region the refractive indices n3 and n4 of the sectors may vary in inverse proportion to the square of the distance from the axis of the wave-guide with n3 being smaller than n4 for equal distances from said axis.

The guide may show a gradual variation of refractive indexes, as well as the dimensions of regions and sectors along the longitudinal axis.

A round birefraction dielectric wave-guide may also be provided consisting of a cascade sequence of a number of guides as defined above.

Figure 2:
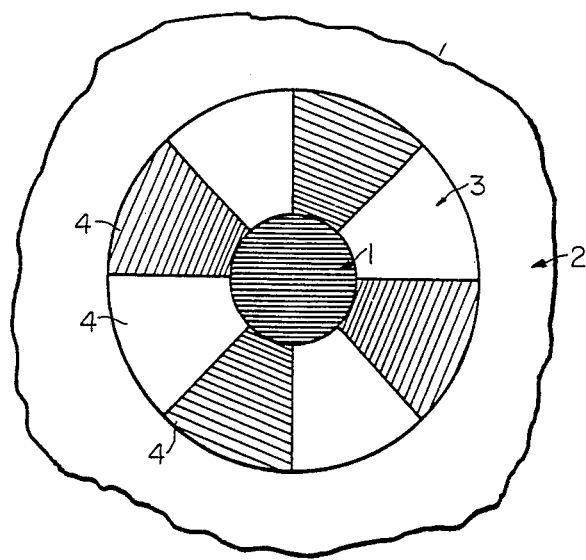
FIG. 2 is a diagrammatic end view of an optical guide of the invention.

An embodiment of the invention, which is given by way of example only, is shown in FIG. 2 of the accompanying drawing.

The embodiments consists in an optical guide in which the refractive index, in the straight section, has the distribution described below. The said guide must be subjected to torsion (for example, on being spun from a premould) around the axis of symmetry of the said section.

The section is made up as follows:

there is a round central region 1, of outside radius a, in which the refractive index is constant (or roughly constant); it is indicated as n1;

there is an outer region 2, delimited internally by a circumference of radius b, in which the refractive index is constant; it is indicated as n2; in addition n2<n1;

the intermediate region 3 between said central and outer regions is divided into m angular sectors 4 (m=8 or a multiple of 8, for the reasons already stated above);

the angular sectors of even position (starting from a suitable angular reference) have constant refractive index, n3 (possibly coinciding with n2 and in any event smaller than n1);

the angular sectors of odd position have a refractive index n4 gradually decreasing with increase in the radial coordinate r, starting from value n1 (or a value slightly lower than this) for r=a, down to value n2 (or a slightly higher value) for r=b; the said index n4 varies according to a law of proportionality to $1/r^2$;

the angular width of the even (or odd) sectors is a parameter of design of the structure.

Referring, for the sake of simplicity, to the case m=8 and using shading for graphic representation of the refractive index (n MAX=dark, n min=white), the foregoing is represented by the sketch in FIG. 2, in which the guide section takes on a typical "war cross" shape.

A fundamental point of the invention is the selection of the law $h/r^2$ (h=proportionality constant) for the variation in the refractive index in the odd sectors. It can in fact be demonstrated by means of mathematical developments starting from Maxwell's equations that this selection allows very precise control of the law by which guided electromagnetic energy is distributed in the guide section, both in radial direction and in azimuthal direction.

It follows from this that it is possible, within arbitrarily pre-established limits, to obtain adjustment of the "war cross" guide field to that of immissary and emissary isotropic guides, thus minimising losses at the terminal connections of the circular birefraction guide.

More precisely, by acting on the design parameters, which are:

indices n1, n2, n3;

radii a, b;

the proportionality constant h; and the angular width of the odd sectors $\phi$, it is possible to obtain any compromise between the above adjustment (and hence the reduction of losses at the ends of the anisotropic guide) and the maximum round birefraction compatible with the condition that the structure should guide energy without radiating it (and hence the extent of the losses distributed along the guide).

In fact, if for the sake of simplicity of description it is assumed that b is equal to the radius of the core of the immissary guide, the core and shell of which, still for the sake of simplicity, are assumed to have indices equal to n1 and n2, it can be seen that:

the obtainable round birefraction increases with decrease of a, decrease of $\phi$, and increase of h;

the adjustment improves if the inverse operations are carried out.

If necessary, the section parameters (refractive indices and geometric dimensions) can be made to vary gradually along the longitudinal axis, for example in order to obtain an initial zone with excellent adjustment followed by another zone with higher round birefraction.

What is claimed is:

1. Round birefraction dielectric wave-guide characterised by the fact that in cross-section, said wave-guide has a central round zone with a refractive index n1, an outer zone with a refractive index n2, an intermediate region divided into an integral number times 8 of angular sectors, respective alternate sectors having refractive indices which are n3 and n4, n3 being selected from reractive indices which are constant and which vary in inverse proportion to the square of the distance from the axis of the wave-guide, and n4 varying in inverse proportion to the square of the distance from the axis of the wave-guide, n1 being greater than n2, n1 greater than n3, and n4 lying between n1 and n2, the said guide being twisted with respect to the longitudinal axis of symmetry thereof.

2. A wave-guide as claimed in claim 1, wherein the central round zone has a radius as small as desired.

3. A wave-guide as claimed in claim 1, wherein in the intermediate region two adjacent sectors have angular widths whose sum is equal to $4\pi$ divided by the total number of sectors.

4. A wave-guide as claimed in claim 1, wherein the refractive index n2 of the outer zone is constant.

5. A wave-guide as claimed in claim 1, wherein the refractive index n2 of the outer zone varies in the radial direction.

6. A wave-guide as claimed in claim 1, wherein in the intermediate region the refractive indexes n3 and n4 of the sectors varying inverse proportion to the square of the distance from the axis of the wave-guide with n3 being smaller than n4 for equal distances from said axis.

7. A wave-guide as claimed in claim 1, wherein the guide shows gradual variation of refractive indexes, as well as the dimensions of regions and sectors along the longitudinal axis.

8. A round birefraction dielectric wave-guide comprising a cascade sequence of a number of guides, each of which is formed according to claim 1 but has refractive indices which is formed according to claim 1 but has refractive indices and geometric dimensions differing from the next adjacent guide.

9. A wave-guide as claimed in claim 1 wherein said wave guide is subjected to torsion around the longitudinal axis of symmetry thereof.

10. A wave-guide as claimed in claim 1 wherein said wave guide is spirally wound around a cylinder.

* * * * *